:::
United States Patent [19]
Herscovici

[11] 3,901,049
[45] Aug. 26, 1975

[54] UNIVERSAL JOINT
[75] Inventor: Saul Herscovici, Waterloo, Iowa
[73] Assignee: Deere & Company, Moline, Ill.
[22] Filed: May 13, 1974
[21] Appl. No.: 469,053

[52] U.S. Cl. .............. 64/17 A; 64/32 F; 277/90; 277/DIG. 8; 74/18.1
[51] Int. Cl. ........................................... F16d 3/26
[58] Field of Search ...... 64/17 A, 32 F, 17 R, 32 R, 64/6; 74/18 R, 18.1; 277/DIG. 8;90;70

[56] References Cited
UNITED STATES PATENTS

| | | | |
|---|---|---|---|
| 2,027,505 | 1/1936 | Winkler | 277/90 |
| 2,610,075 | 9/1952 | Haake | 277/90 |
| 2,983,125 | 5/1961 | Peickii et al. | 277/90 |
| 3,074,728 | 1/1963 | Freed | 277/90 |
| 3,200,615 | 8/1965 | Stokely | 64/17 A |
| 3,773,337 | 11/1973 | Adams | 277/90 |

*Primary Examiner*—Samuel Scott
*Assistant Examiner*—Randall Heald

[57] ABSTRACT

A universal joint including bearing seals which assure each bearing fresh lubrication each time the universal joint is lubricated. It consists of a journal cross with bearings mounted on each of the trunnions. Lubrication to each of the bearings enters the bearing cup and is retained by an annular seal including a boot of an elastomeric material which has a seal lip at one end sealingly engaging the bearing cup and has a seal lip on its other end slidably and sealingly engaging the trunnion. The boot means is capable of extending under lubricant pressure from a normal contracted unstressed condition to an extended stressed condition in which the lips remains substantially lubricant-tight until the lubricant pressure exceeds the pressure required to extend the boot at which pressure the lips will yield to permit escape of lubricant. Once the pressure is relieved, the lips close and the boots remain extended until rotation of the universal joint at a predetermined speed causes the lips to yield under the pressure created by the centrifugal force on the seals and the boots contract to their normal condition.

6 Claims, 4 Drawing Figures

UNIVERSAL JOINT

BACKGROUND OF THE INVENTION

The present invention relates generally to universal joints and more specifically to universal joints with bearing seals. There are generally four bearings on a universal joint which are simultaneously lubricated from one grease fitting through four lubrication passages in the universal joint cross. To supply the four bearings, all seal lips have to open nearly simultaneously under grease gun pressure, and a bearing will not receive fresh lubricant if its lip does not open to allow the lubricant to escape from the bearing. Some lips on the same universal joint may be substantially unyieldable and remain lubricant-tight repeatedly during re-lubrication. Without fresh lubrication a bearing could be subject to early failure due to insufficient initial lubrication, dirt or water contamination, or lubricant degradation or solidification.

At present, there are no suitable means in the universal joint art for overcoming the above-mentioned problems. Attempts have been made to resolve the above problems by such expedients as one-way valves in each of the trunnions as shown in the U.S. Pat. No. 3,470,711 to J. A. Kayser or by making the lip means so less resistive to lubricant flow that normal lubrication procedures would provide new lubrication to all bearings as shown in the U.S. Pat. No. 3,377,820 to W. J. Smith, Jr.; however, none of these expedients has been totally satisfactory.

SUMMARY OF THE INVENTION

It is the general object of the present invention to provide a seal incorporating an expanding boot which assures flow of fresh lubricant to each of the bearings in a universal joint during initial lubrication and all subsequent re-lubrication.

It is the subsidary object to provide a contamination immune seal.

The above and additional objectives and advantages of the invention will become apparent to those skilled in the art by a reading of the following detailed description when taken in conjunction with the accompanying drawings.

DESCRIPTION OF THE PREFERRED EMBODIMENT

Figure 1:
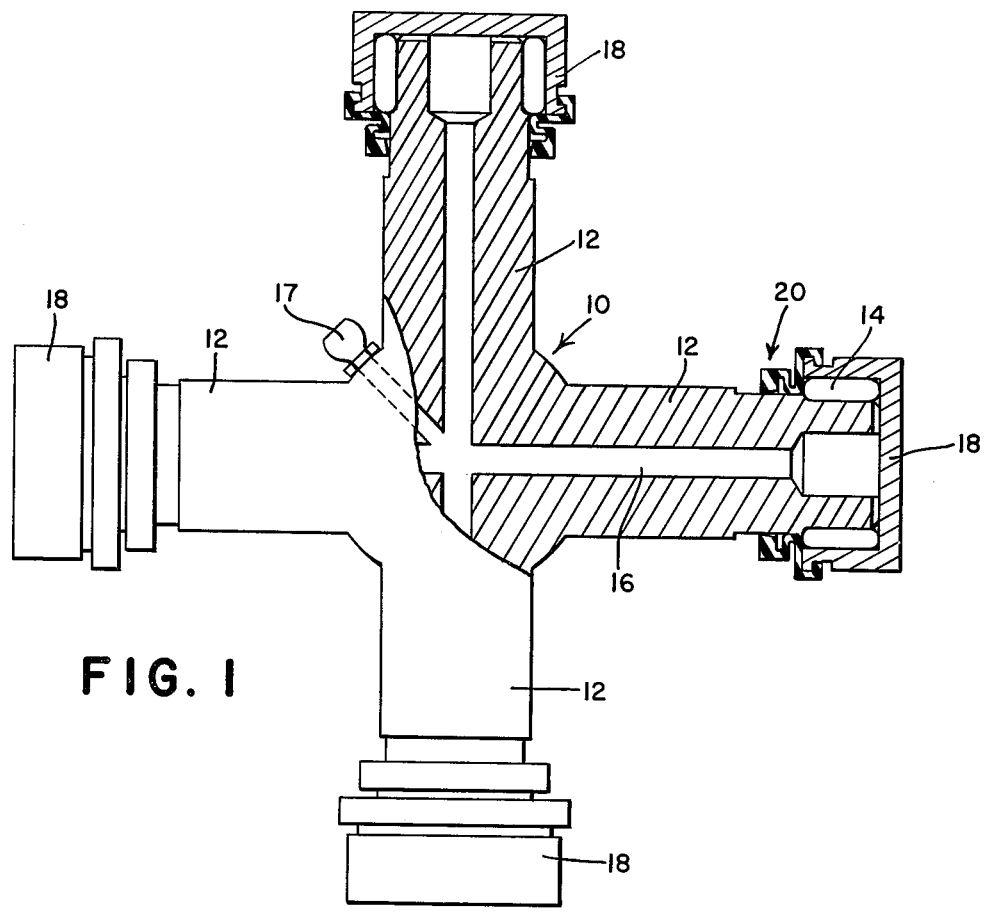
FIG. 1 is a cross-sectional view of a typical four-armed universal joint incorporating the invention.

Referring now to the drawings, a universal joint according to the invention includes a cross 10 having a plurality of trunnions 12. Bearings 14 are mounted on the outer end of each trunnion 12 and lubrication passages 16 extend through the trunnions to conduct lubricant from a fitting 17 to the bearings 14. A bearing cup 18 surrounds each bearing 14 and retains the lubricant supplied to the bearing 14. An annular seal 20 of an elastomeric material is provided for each bearing and each includes an annular boot 21 forming an expandable lubrication reservoir 22. Each boot 21 has one end in the form of a seal lip 23 sealingly engaging the bearing cup 18 and extends inwardly toward the trunnion junction to a free terminal end which takes the form of an annular seal rim 28 having an annular seal lip 24 slidingly and sealingly engaging the trunnion 12.

Figure 2:
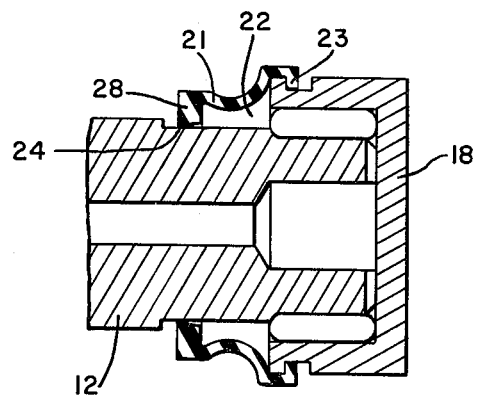
FIG. 2 is a cross-sectional view of one trunnion of the universal joint showing the invention in one condition of its operation.

In operation the universal joint is lubricated by application of lubricant through fitting 17 with a grease gun (not shown). The lubricant is forced through the lubrication passages 16 into the bearings 14 and is retained therearound by the bearing cups 18. Once the lubricant fills the bearings 14 and cups 18, it fills the reservoirs 22. Further addition of lubricant urges the reservoirs 22 to expand and the lips 24 and rims 28 to slide inwardly toward the junctions of the trunnions until the reservoirs 22 have reached their maximum volume and the boots 21 are extended to their stressed condition as shown in FIG. 2. Once all the boots are fully extended to their stressed condition lubricant pressure will continue to increase until the additional pressure causes the lips 23 or 24 to yield and open circumferentially outwardly to permit lubrication to escape to the outside between the lips 23 and the cup 18 or the lips 24 and the trunnions 12.

Figure 3:
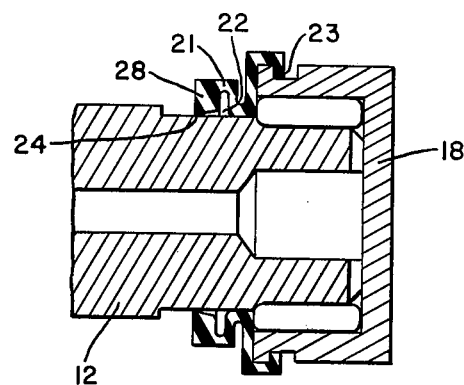
FIG. 3 is a cross-sectional view of the trunnion showing the invention in another condition of its operation.

The boots 21 will remain in their expanded position until the universal joint is rotated at a predetermined speed (approximately 1,000 rpm) where centrifugal force on the rims 28 increases the lubricant pressure causing the lips 23 or 24 to open, lubricant to escape, and the lips 24 and rims 28 to slide outwardly contracting the boots 21 to their normal unstressed condition as shown in FIG. 3.

Upon subsequent re-lubrication this cycle as aforein described repeats itself.

Figure 4:
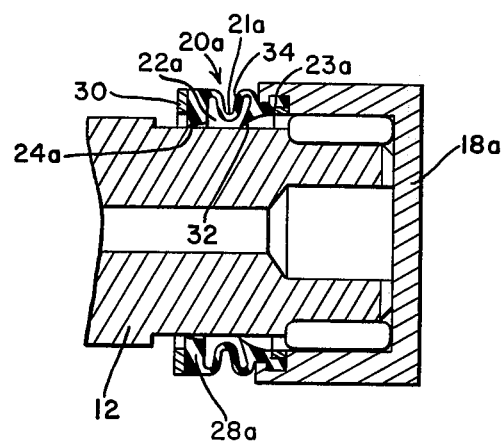
FIG 4 is a cross-sectional view of a universal joint trunnion showing an alternate embodiment of the invention.

While the invention has been described in conjunction with a specific embodiment, it is to be understood that many alternatives, modifications, and variations will be apparent to those skilled in the art in light of aforegoing description. For example, as shown in FIG. 4, wherein the same numbers as in prior figures refer to the same parts, annular weights 30 may be added to the rims 28a of seals 20a causing the boots 21a to contract under centrifugal force to their unstressed condition at lower universal joint rotating speeds. Further, as shown in FIG. 4, additional annular seal lips 32 may be incorporated to prevent any contaminants from being drawn into the bearings 14 or cups 18a by the sliding action of lips 24a on trunnion 12. Still further, convolutions 34 forming reservoirs 22a may be added to provide for more thorough change of lubricant. Accordingly, it is intended to embrace all such alternatives, modifications, and variations that fall within the spirit and scope of the intended claims.

I claim:

1. A universal joint comprising: a journal cross having a plurality of trunnions; bearing means surrounding each of the trunnions; lubrication means associated with the journal cross for conducting lubricant to each of the bearing means; a bearing cup on each of the bearing means; and an annular seal of yieldable elastomeric material for each bearing cup including normally contracted, extendable and contractable annular boot means extending between the bearing cup and the trunnion, annular seal lip means at the outer end of the boot means sealingly engaging the cup, and annular seal lip means at the inner end of the boot means slidingly and sealingly engaging the trunnion; said annular seal being so constructed and arranged that upon lubricant being conducted to the bearing means, the lip means will not yield under lubricant pressure until after complete extension of the boot means, then upon rotation of the universal joint at a predetermined speed, the pressure caused by centrifugal force acting on the seal causes the lip means to yield, the lubricant in the boot means to escape and the boot means to contract.

2. A universal joint as claimed in claim 1 wherein the elastomeric material of the boot means has a convoluted configuration when in the contracted condition.

3. A universal joint as claimed in claim 1 wherein the inward lip means of the seal includes weight means which aids contraction of the boot means upon rotation of the universal joint.

4. A universal joint comprising: a journal cross having a plurality of trunnions; bearing means surrounding each of the trunnions; lubrication means associated with the journal cross for conducting lubricant to each of the bearing means; and an annular seal of yieldable elastomeric material for each bearing cup including normally contracted, extendable and contractable annular boot means extending between the bearing cup and the trunnion, annular seal lip means at the outer end of the boot means sealingly engaging the cup, and a plurality of annular seal lip means at the inner end of the boot means slidingly and sealingly engaging the trunnion; said annular seal being so constructed and arranged that upon lubricant being conducted to the bearing means, the lip means will not yield under lubricant pressure until after complete extension of the boot means, then upon rotation of the universal joint at a predetermined speed, the pressure caused by centrifugal force acting on the seal causes the lip means to yield, the lubricant in the boot means to escape, and the boot means to contract.

5. A universal joint as claimed in claim 4 wherein the elastomeric material of the boot means has a convoluted configuration when in the contracted condition.

6. A universal joint as claimed in claim 4 wherein the inward lip means of the seal include weight means which aids contraction of the boot means upon rotation of the universal joint.

\* \* \* \* \*